(12) United States Patent
Sakai

(10) Patent No.: US 9,057,869 B2
(45) Date of Patent: Jun. 16, 2015

(54) POSITIVE-LEAD TYPE ZOOM LENS AND IMAGE PICKUP APPARATUS EQUIPPED WITH THE SAME

(71) Applicant: CANON KABUSHIKI KAISHA, Tokyo (JP)

(72) Inventor: Hideki Sakai, Sakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/902,646

(22) Filed: May 24, 2013

(65) Prior Publication Data

US 2013/0321681 A1 Dec. 5, 2013

(30) Foreign Application Priority Data

May 30, 2012 (JP) ................. 2012-123562

(51) Int. Cl.
*G03B 13/00* (2006.01)
*H04N 5/232* (2006.01)
*G02B 15/14* (2006.01)
*G02B 15/173* (2006.01)

(52) U.S. Cl.
CPC .............. *G02B 15/14* (2013.01); *G02B 15/173* (2013.01)

(58) Field of Classification Search
USPC ............ 348/240.99, 345; 359/687, 683–686, 359/715, 740, 774
See application file for complete search history.

(56) References Cited

U.S. PATENT DOCUMENTS

| 2006/0132928 | A1 | 6/2006 | Nakatani | |
|---|---|---|---|---|
| 2007/0229968 | A1* | 10/2007 | Satori et al. | 359/676 |
| 2008/0212206 | A1* | 9/2008 | Hatada | 359/758 |
| 2009/0174950 | A1* | 7/2009 | Hankawa et al. | 359/687 |
| 2013/0141797 | A1* | 6/2013 | Hagiwara | 359/684 |

FOREIGN PATENT DOCUMENTS

| CN | 101256271 A | 9/2008 |
|---|---|---|
| JP | 2006-017165 A | 1/2006 |
| JP | 2006-171655 A | 6/2006 |
| JP | 2008-281927 A | 11/2008 |
| JP | 2009-047903 A | 3/2009 |

* cited by examiner

*Primary Examiner* — Antoinette Spinks

(74) *Attorney, Agent, or Firm* — Canon USA Inc IP Division

(57) ABSTRACT

A zoom lens includes, in order from an object side to an image side, a first lens unit having positive refractive power, a second lens unit having negative refractive power, and a third lens unit having positive refractive power, wherein at least the first to third lens units move during zooming from a wide-angle end to a telephoto end, and a focal length f2 of the second lens unit, a focal length ft of the entire zoom lens at the telephoto end, and a refractive index Nd2n of a lens having negative refractive power closest to the object side included in the second lens unit are appropriately set.

15 Claims, 17 Drawing Sheets

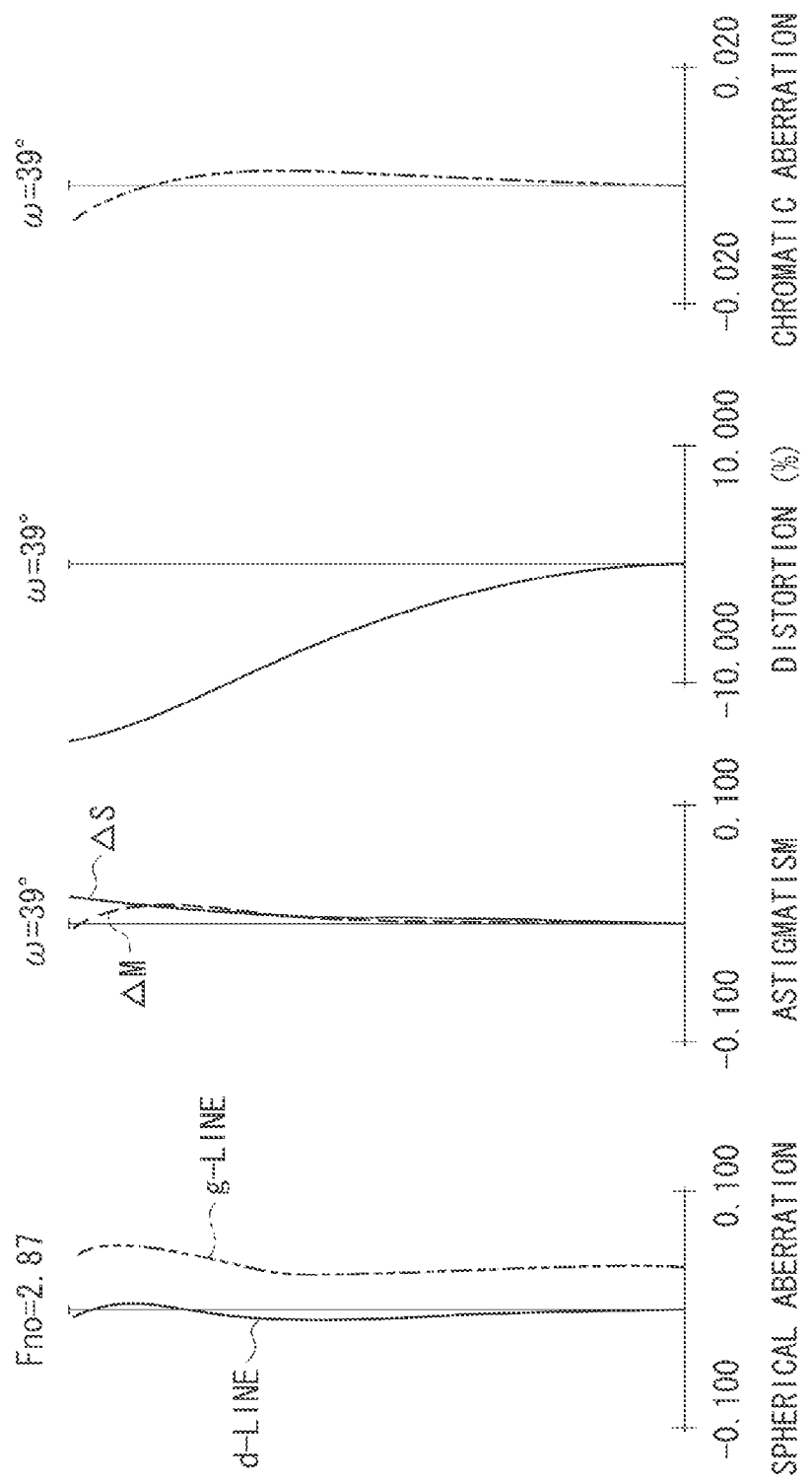

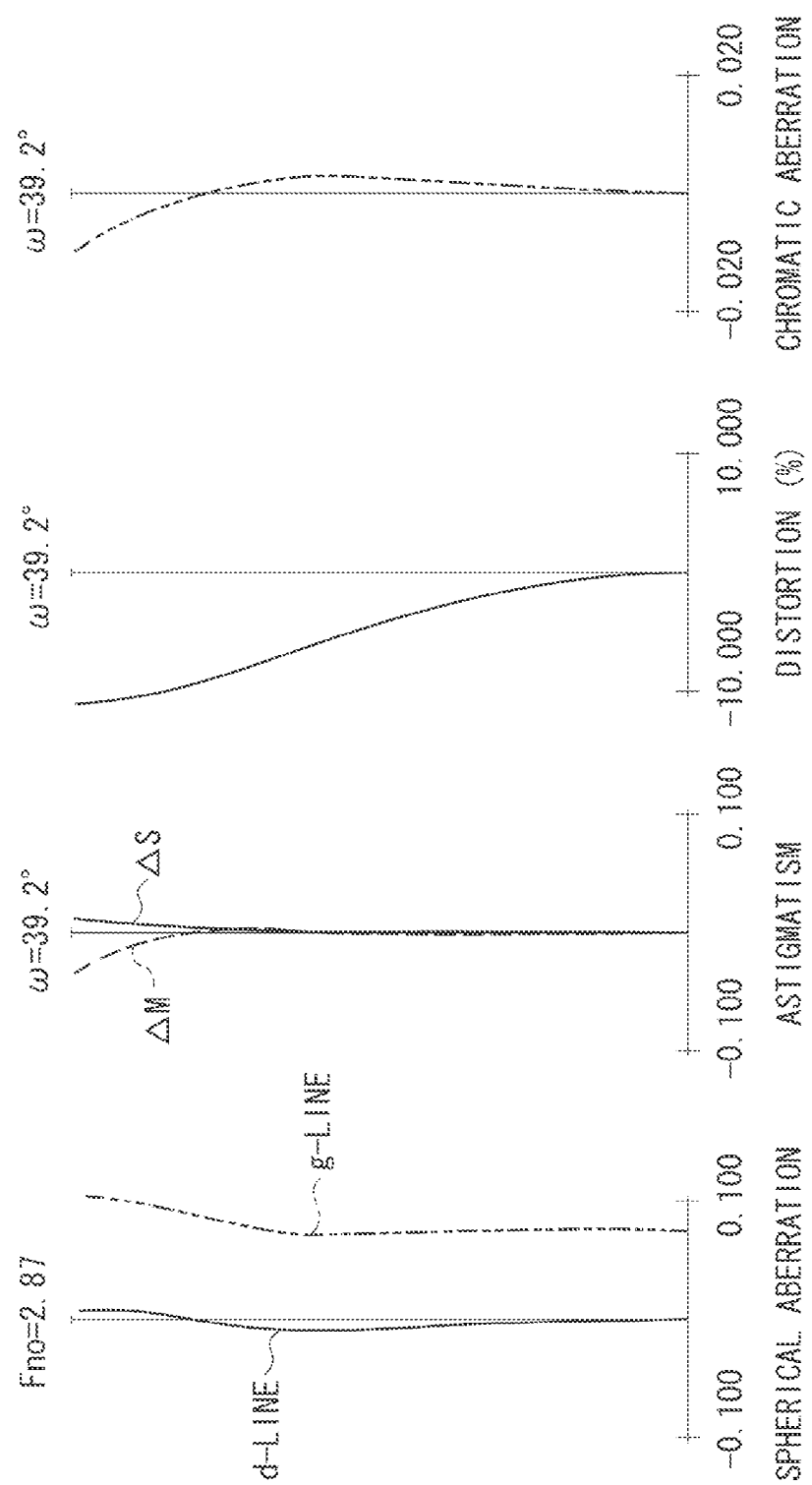

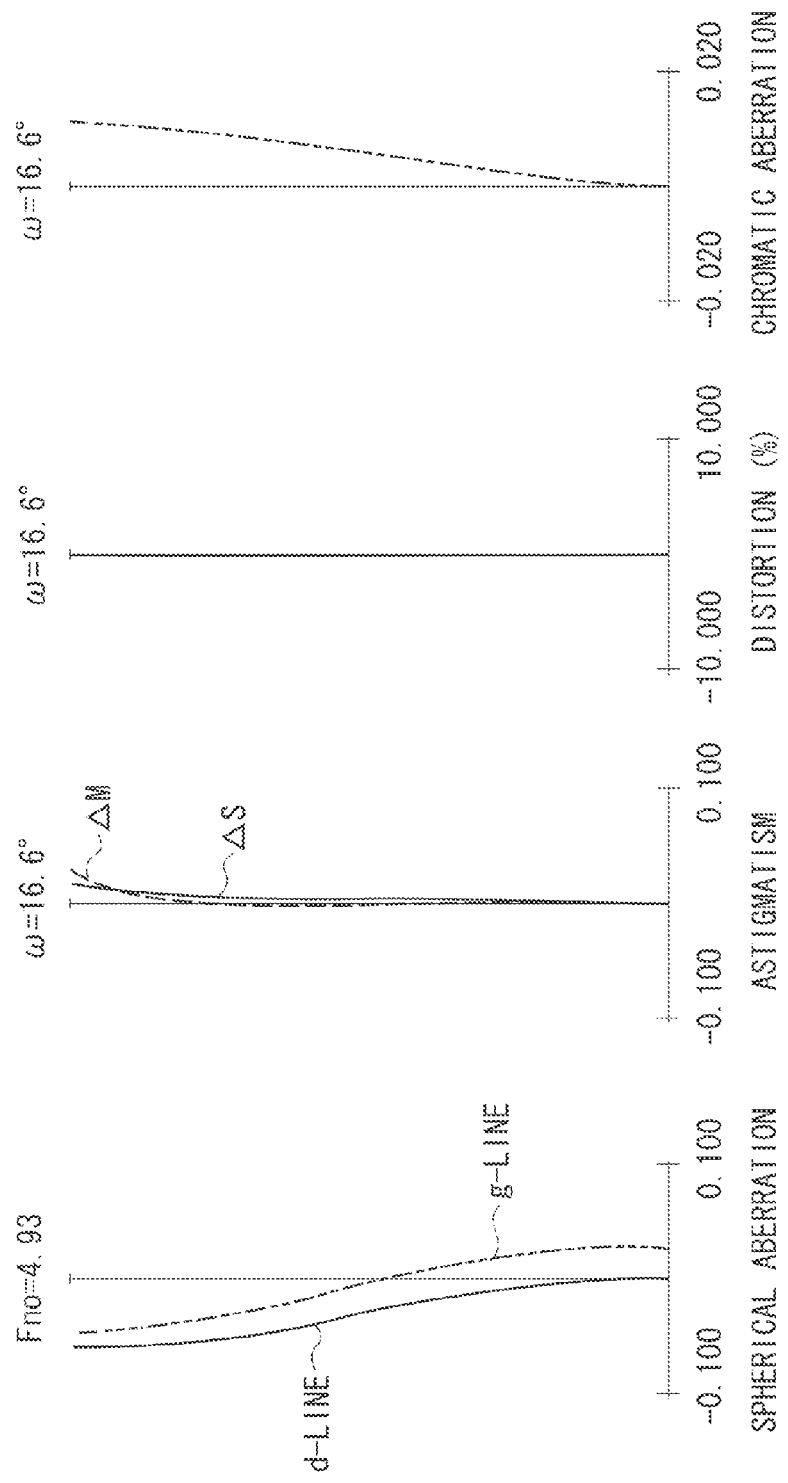

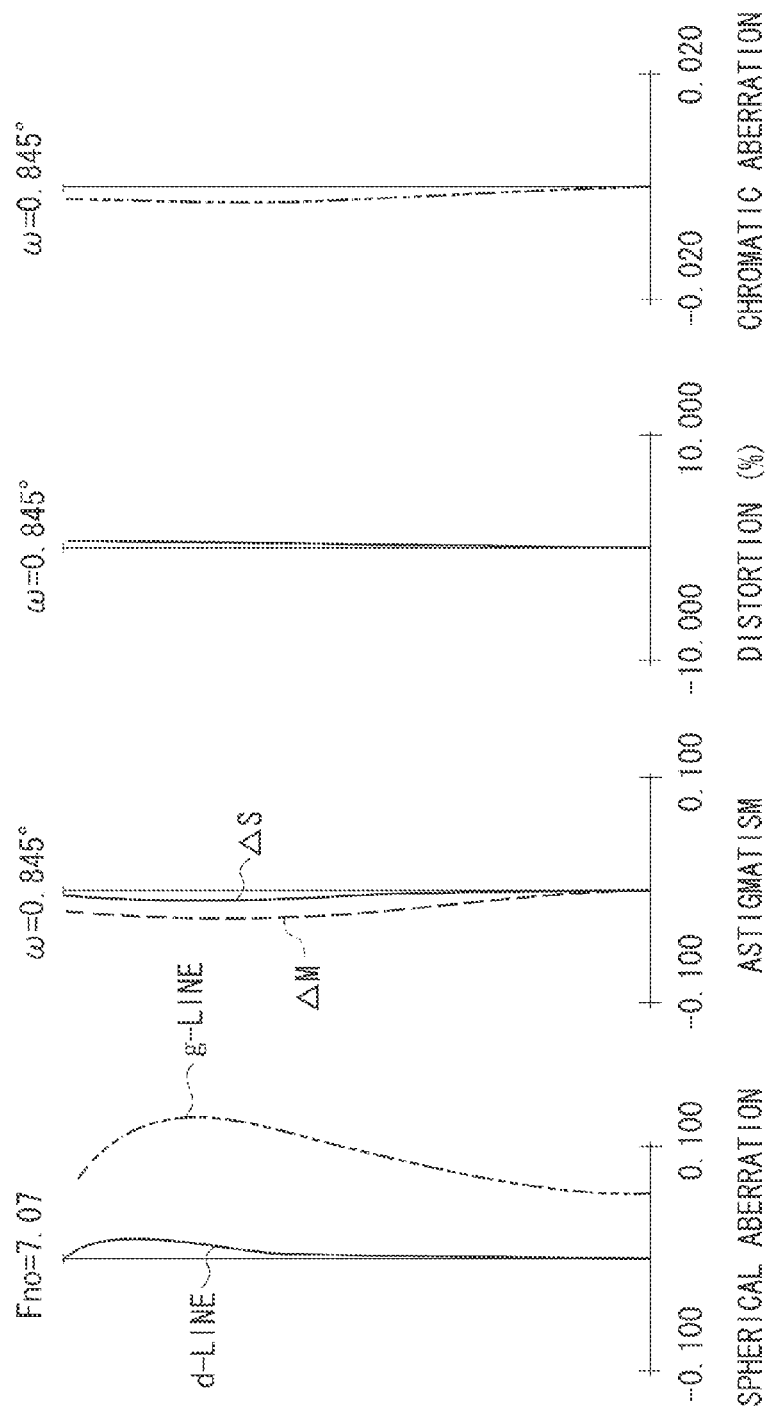

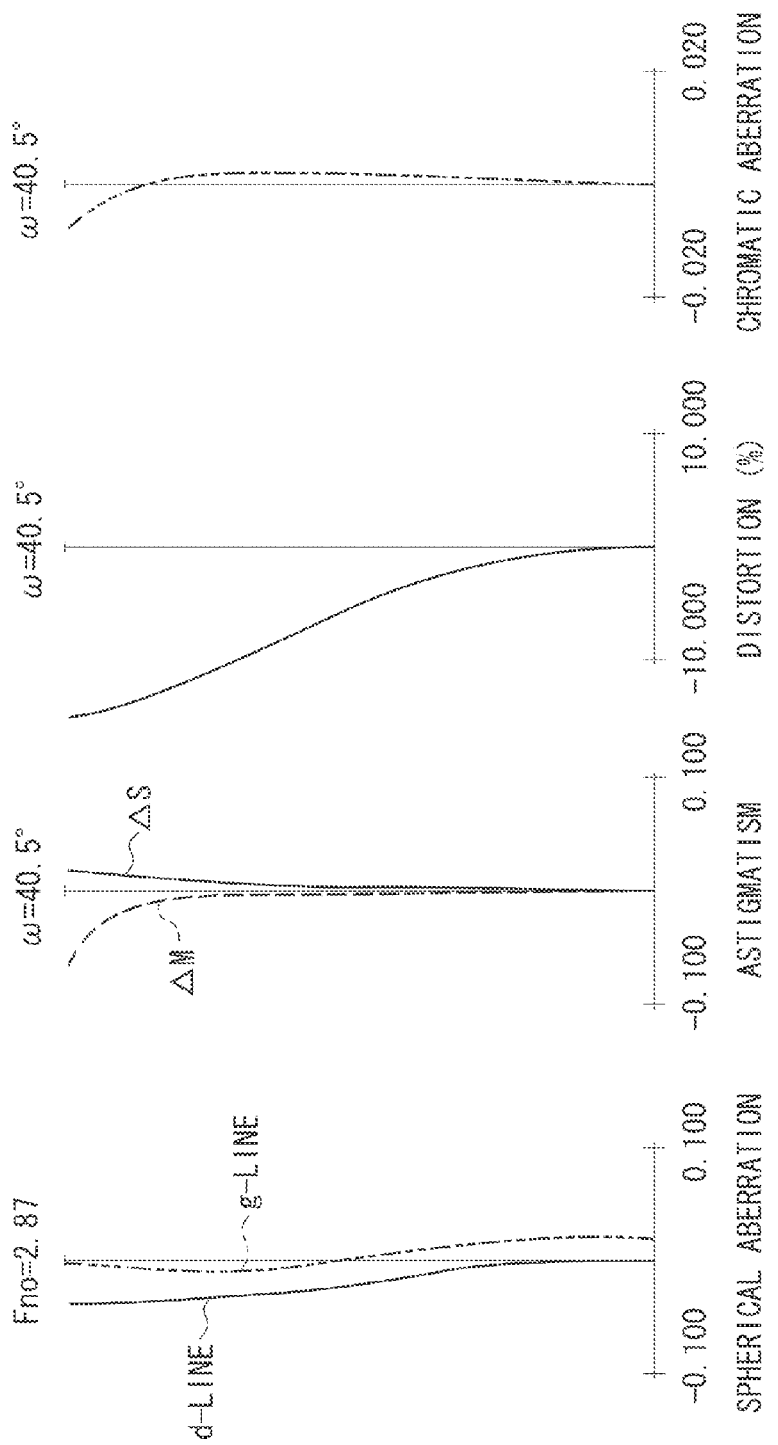

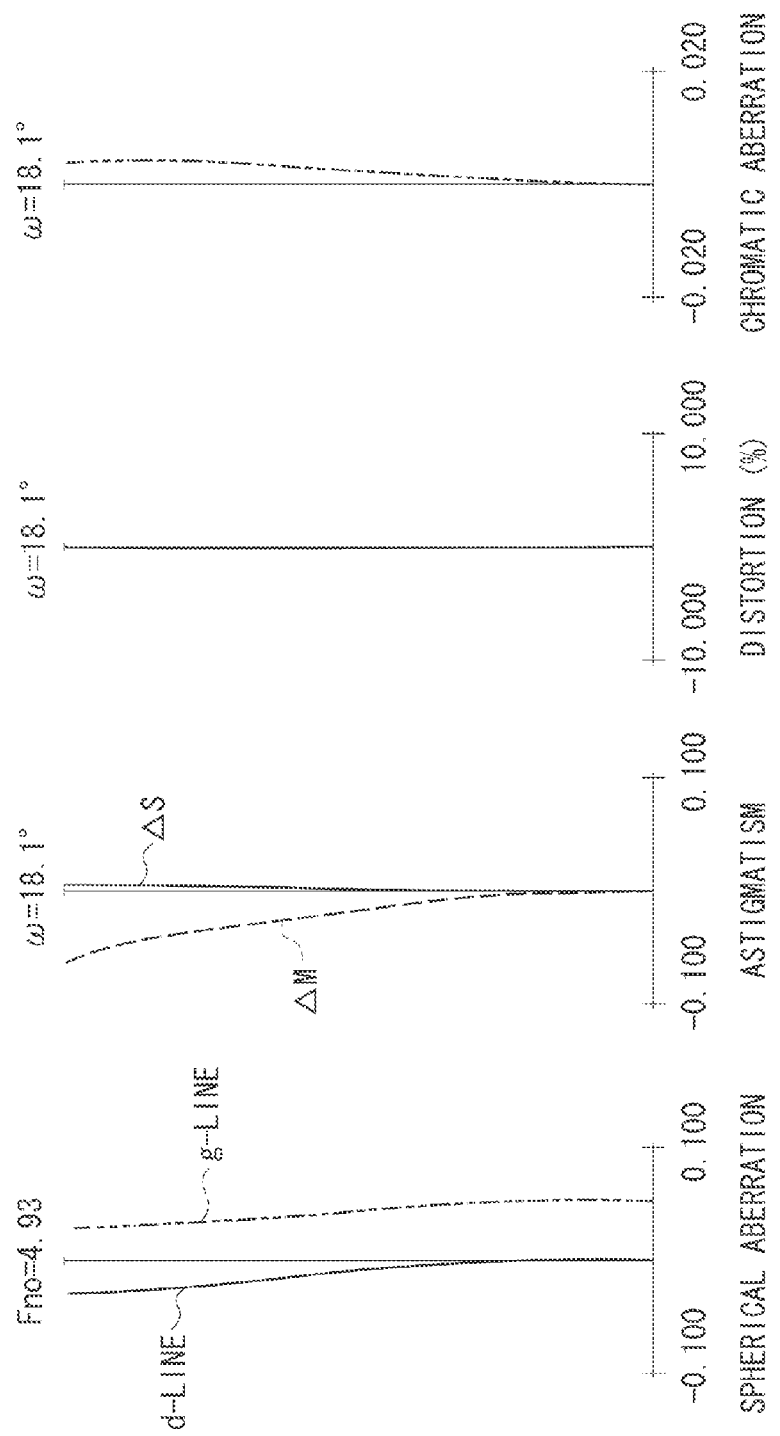

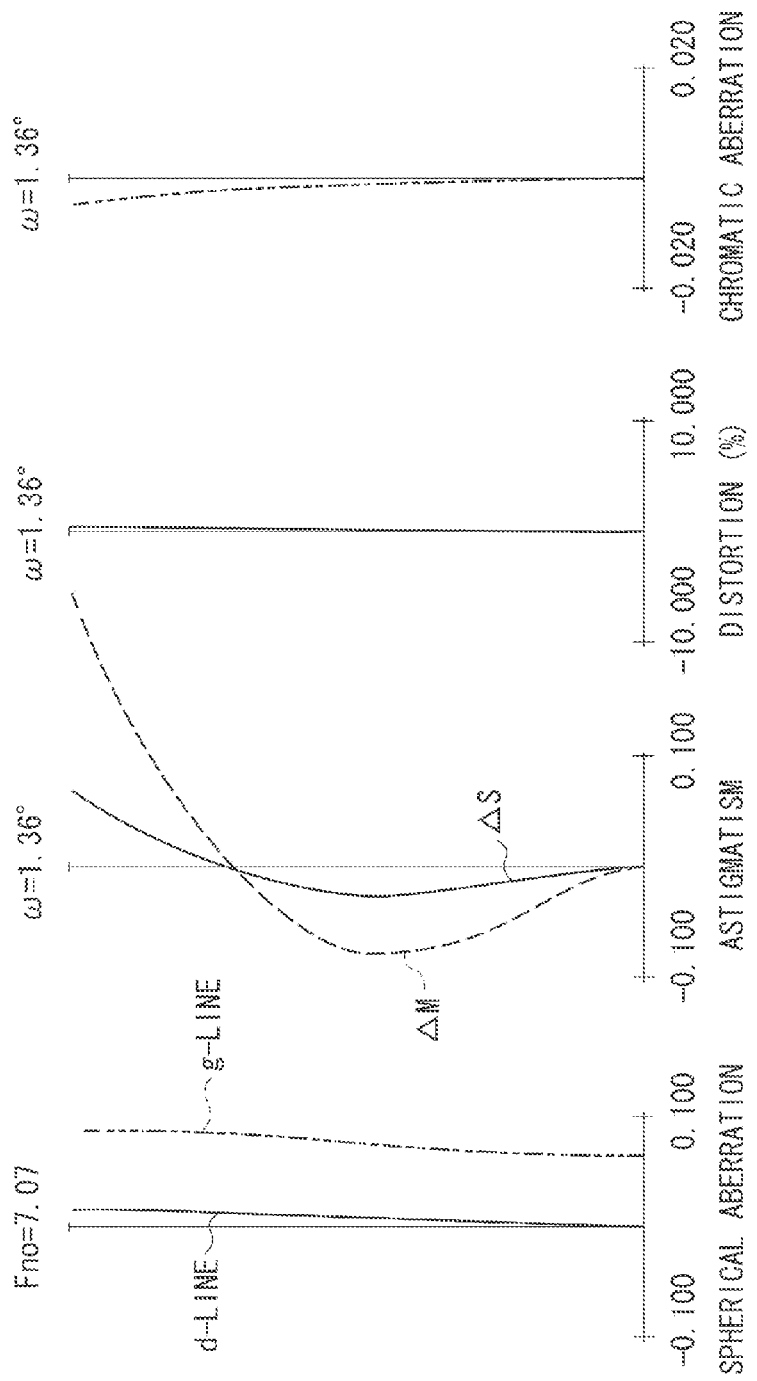

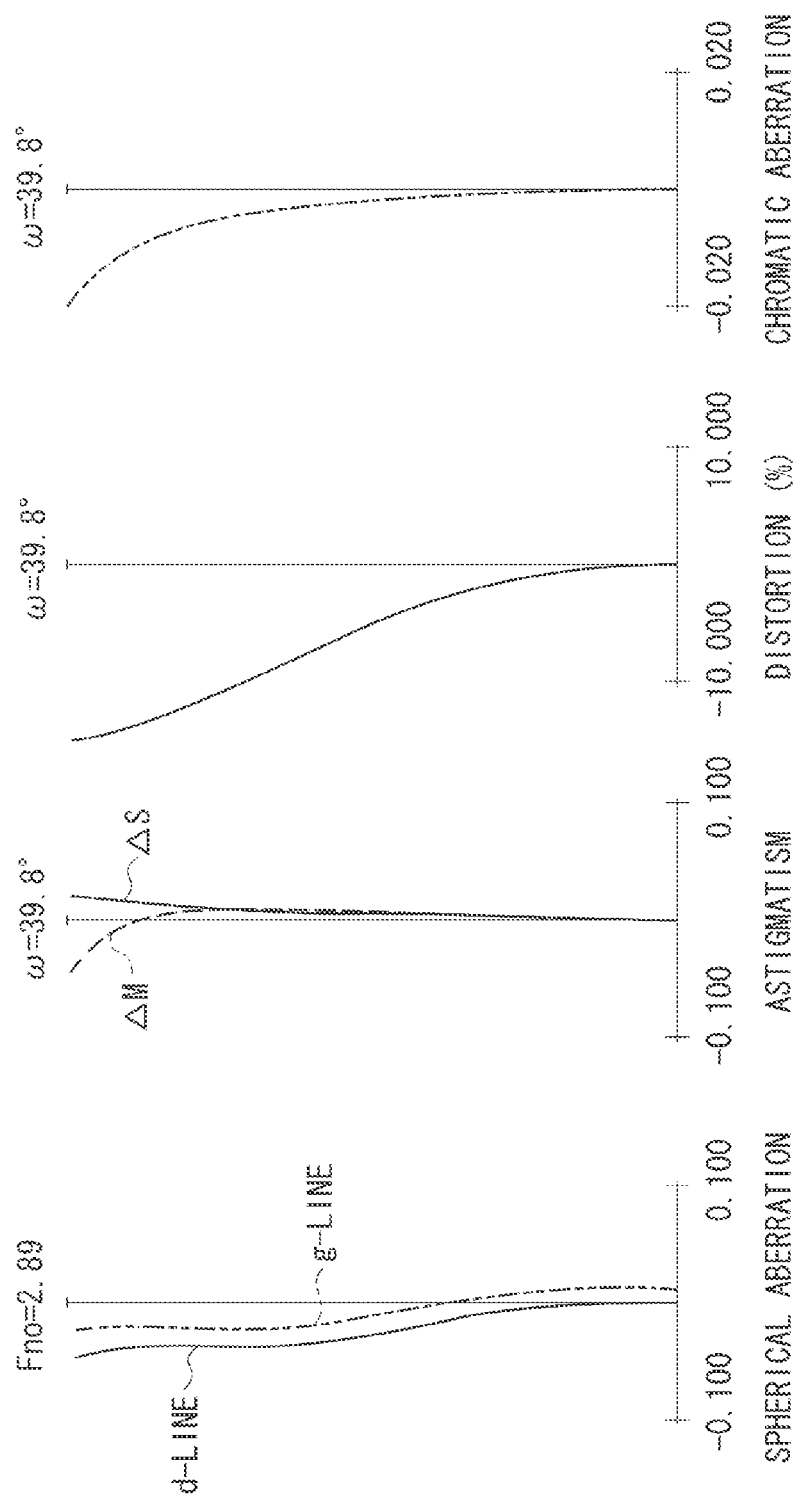

… (US 9,057,869 B2)

POSITIVE-LEAD TYPE ZOOM LENS AND IMAGE PICKUP APPARATUS EQUIPPED WITH THE SAME

BACKGROUND OF THE INVENTION

1. Field of the Invention

The present disclosure relates to a zoom lens and an image pickup apparatus, such as a video camera, a monitoring camera, a digital still camera, and a broadcast camera, equipped with the same.

2. Description of the Related Art

In recent years, an image pickup apparatus, such as a video camera, a digital still camera, a broadcast camera, and a monitoring camera using a solid-state image sensor, and a camera using a silver-halide film, tends to be miniaturized in its entire size with a high functionality. In a photographic optical system used in such an image pickup apparatus, it is demanded that a zoom lens have a short total length, a high zoom ratio, and a high resolution. As a zoom lens satisfying such demands, there is known a positive-lead type zoom lens in which a lens unit having positive refractive power is located on the most object side.

As a positive-lead type zoom lens, there is known a zoom lens including a first lens unit having positive refractive power, a second lens unit having negative refractive power, and a third lens unit having positive refractive power in order from an object side to an image side.

In Japanese Patent Application Laid-Open No. 2006-171655, there is discussed a zoom lens including four lens units having positive, negative, positive, and positive refractive power in order from an object side to an image side. In addition, in Japanese Patent Application Laid-Open No. 2009-047903, there is discussed a zoom lens including five lens units having positive, negative, positive, positive, and positive refractive power in order from an object side to an image side. Furthermore, in Japanese Patent Application Laid-Open No. 2008-281927, there is discussed a zoom lens including five lens units having positive, negative, positive, negative, and positive refractive power in order from an object side to an image side.

In general, in order to obtain a zoom lens having a high zoom ratio while achieving miniaturization in the entire zoom lens, it is desirable to increase the refractive power (optical power, that is, an inverse of the focal length) of each unit of the zoom lens and reduce the number of lens elements. However, in such a zoom lens, an aberration fluctuation caused by zooming increases. Therefore, it is difficult to obtain excellent optical performance over the entire zoom range.

In the positive-lead type zoom lens described above, in order to obtain excellent optical performance and miniaturize the entire zoom lens with a high zoom ratio, it is important to appropriately set the refractive power of each lens unit or a refractive index of a material used in the lens. Particularly, it is important to appropriately set the refractive power of the second lens unit or the refractive index of a negative lens included in the second lens unit.

SUMMARY OF THE INVENTION

An embodiment of the present invention is directed to a zoom lens capable of achieving miniaturization in the entire zoom lens and high optical performance over the entire zoom range with a wide angle of view and a high zoom ratio, and an image pickup apparatus equipped with the same.

According to an aspect of the present invention, a zoom lens includes, in order from an object side to an image side, a first lens unit having positive refractive power, a second lens unit having negative refractive power, and a third lens unit having positive refractive power, wherein at least the first lens unit, the second lens unit, and the third lens unit move during zooming from a wide-angle end to a telephoto end, and wherein the following conditions are satisfied:

$$0.01 < |f2|/ft < 0.057, \text{ and}$$

$$1.90 < Nd2n < 2.50,$$

where f2 denotes a focal length of the second lens unit, ft denotes a focal length of the entire zoom lens at the telephoto end, and Nd2n denotes a refractive index of a lens having negative refractive power closest to the object side included in the second lens unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C are aberration charts of the zoom lens according to the first exemplary embodiment at the wide-angle end, in a middle zoom position, and at the telephoto end, respectively.

FIGS. 4A, 4B, and 4C are aberration charts of the zoom lens according to the second exemplary embodiment at the wide-angle end, in a middle zoom position, and at the telephoto end, respectively.

FIGS. 6A, 6B, and 6C are aberration charts of the zoom lens according to the third exemplary embodiment at the wide-angle end, in a middle zoom position, and at the telephoto end, respectively.

FIGS. 8A, 8B, and 8C are aberration charts of the zoom lens according to the fourth exemplary embodiment at the wide-angle end, in a middle zoom position, and at the telephoto end, respectively.

DESCRIPTION OF THE EMBODIMENTS

Various exemplary embodiments, features, and aspects of the invention will be described in detail below with reference to the drawings.

Hereinafter, a zoom lens according to an exemplary embodiment of the present invention and an image pickup apparatus equipped with the same will be described. The zoom lens according to an exemplary embodiment of the present invention includes a first lens unit having positive refractive power, a second lens unit having negative refractive power, and a third lens unit having positive refractive power in order from an object side to an image side. Each lens unit moves from a wide-angle end (short focal length end) to a telephoto end (long focal length end) during zooming (variation of magnification).

Specifically, during zooming from the wide-angle end to the telephoto end, a distance between the first and second lens units increases, and a distance between the second and third lens units decreases at the telephoto end rather than the wide-angle end. The first lens unit moves along a locus convex toward the image side, the second lens unit moves toward the image side, and the third lens unit moves toward the object side.

Figure 1:
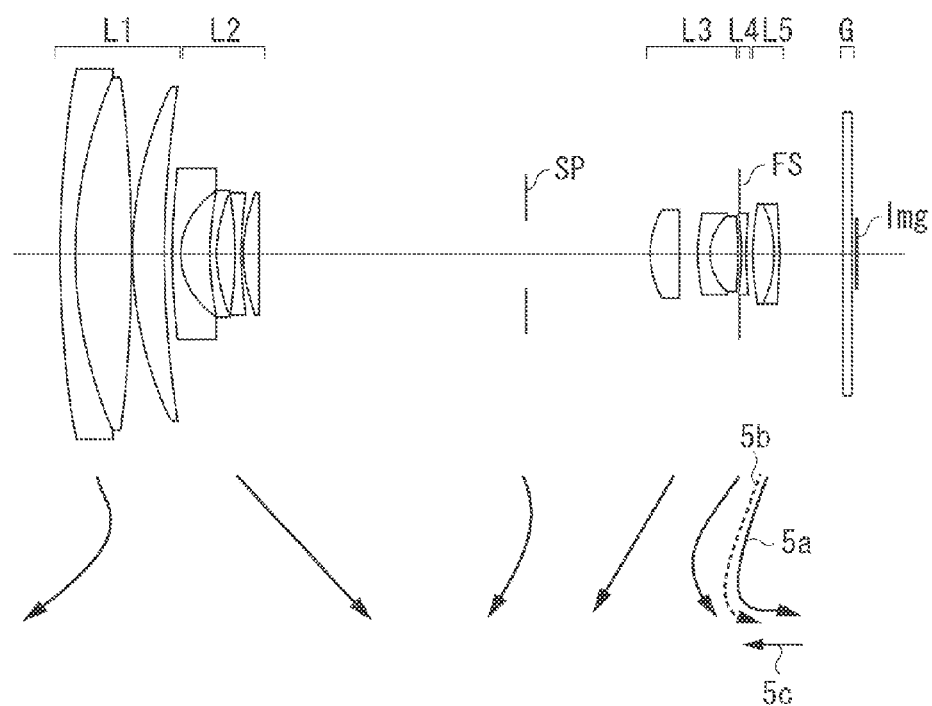
FIG. 1 is a cross-sectional view illustrating a zoom lens according to a first exemplary embodiment at the wide-angle end.
Figure 2B:
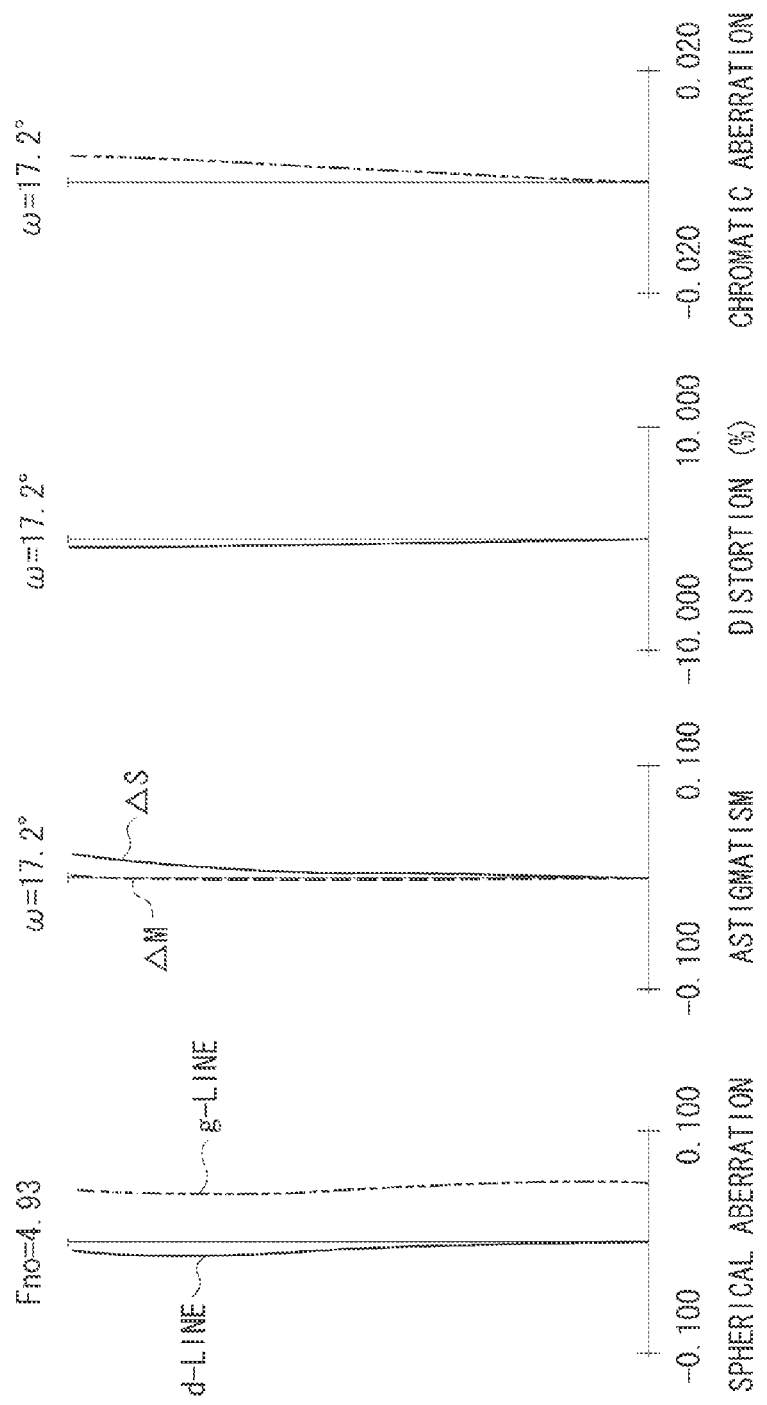
Figure 2C:
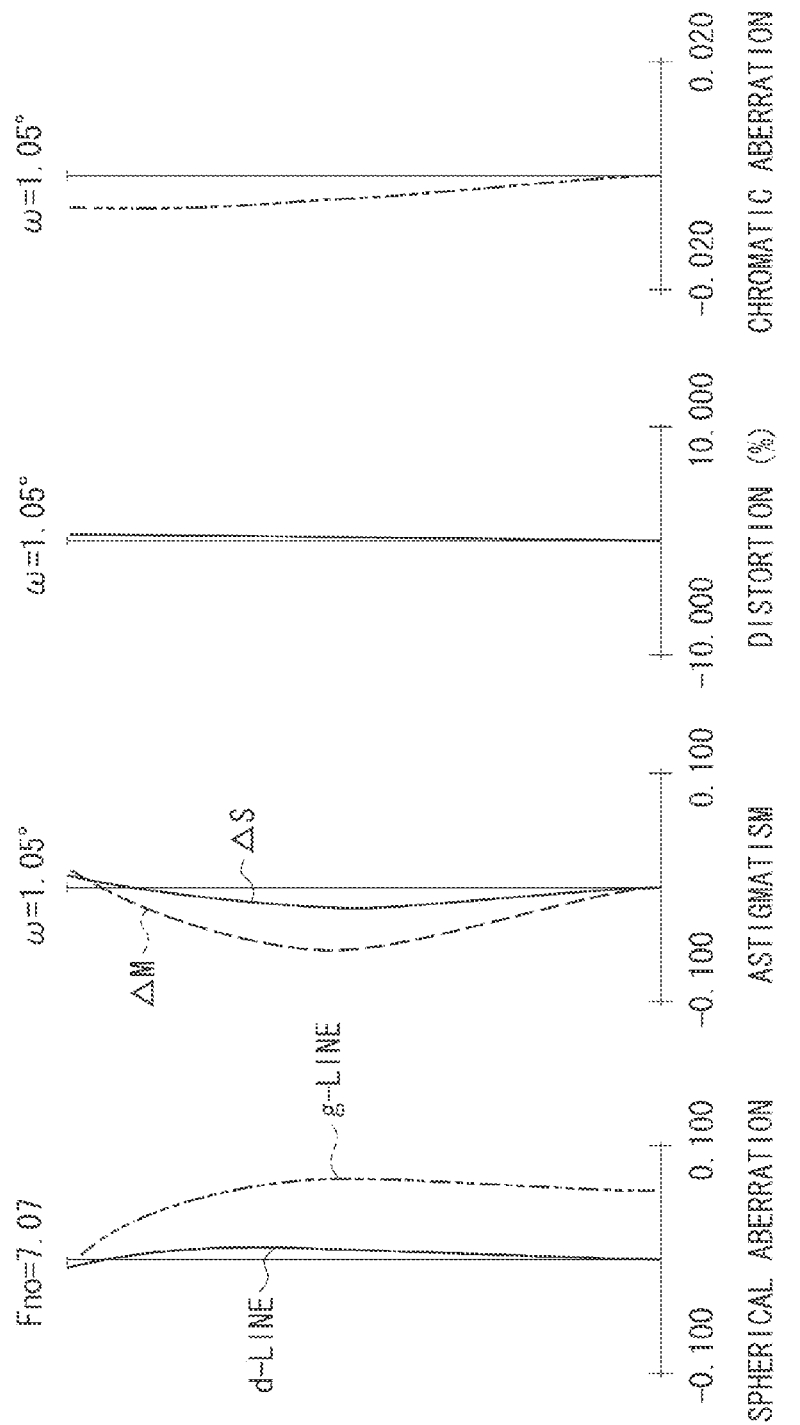
Figure 3:
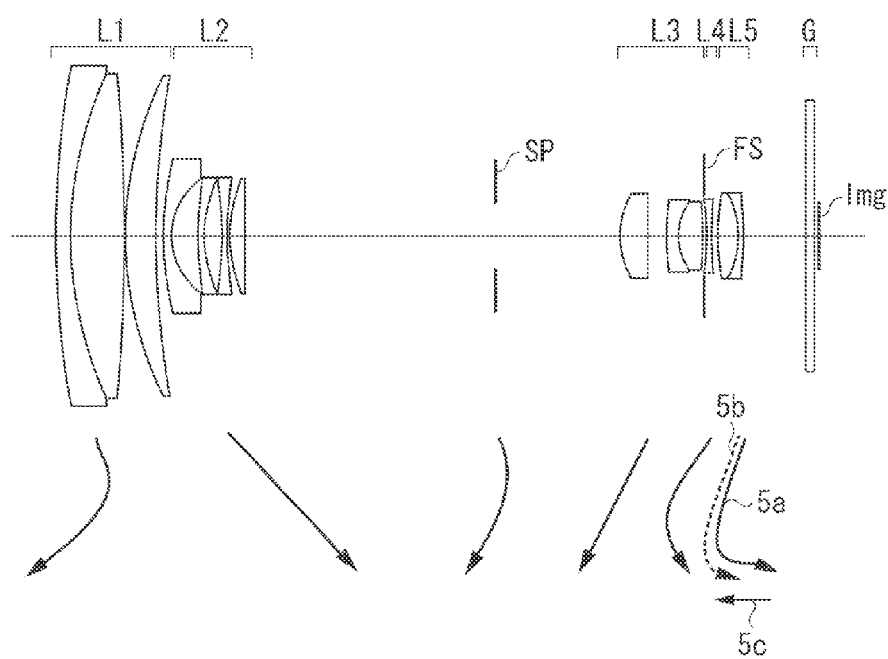
FIG. 3 is a cross-sectional view illustrating a zoom lens according to a second exemplary embodiment at the wide-angle end.

FIG. 1 is a cross-sectional view illustrating a zoom lens according to a first exemplary embodiment at the wide-angle end. FIGS. 2A, 2B, and 2C are aberration charts of the zoom lens according to the first exemplary embodiment at the wide-angle end, in a middle zoom position, and at the telephoto end, respectively. The first exemplary embodiment relates to a zoom lens having a zoom ratio of 51.39 and an aperture ratio of, approximately, 2.87 to 7.07. FIG. 3 is a cross-sectional view illustrating a zoom lens according to a second exemplary embodiment at the wide-angle end. FIGS. 4A, 4B, and 4C are aberration charts of the zoom lens according to the second exemplary embodiment at the wide-angle end, in a middle zoom position, and at the telephoto end, respectively. The second exemplary embodiment relates to a zoom lens having a zoom ratio of 64.34 and an aperture ratio of, approximately, 2.87 to 7.07.

Figure 5:
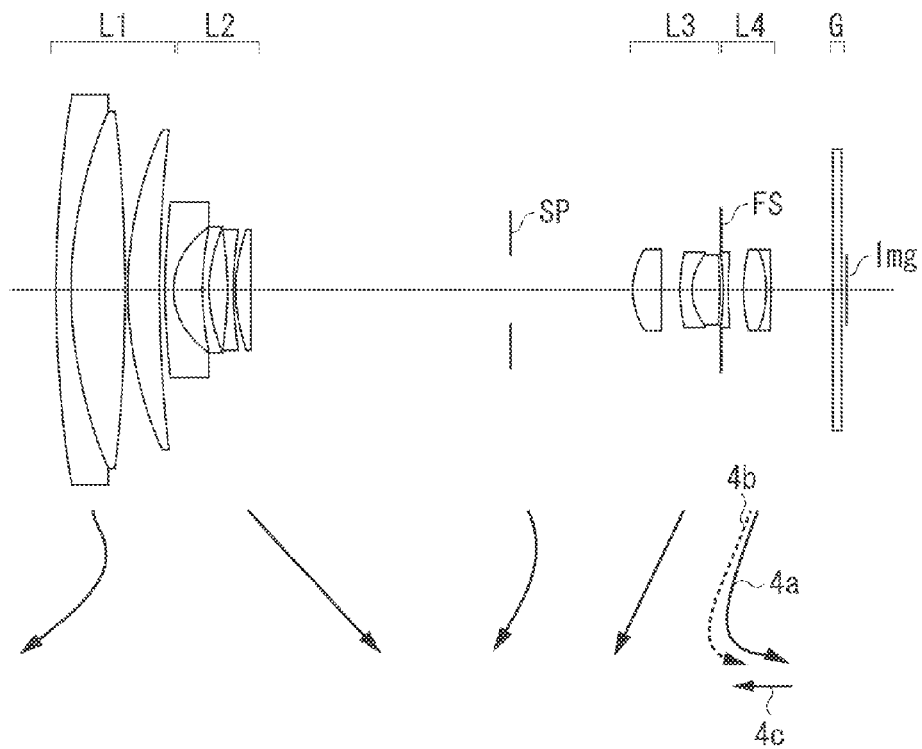
FIG. 5 is a cross-sectional view illustrating a zoom lens according to a third exemplary embodiment at the wide-angle end.
Figure 7:
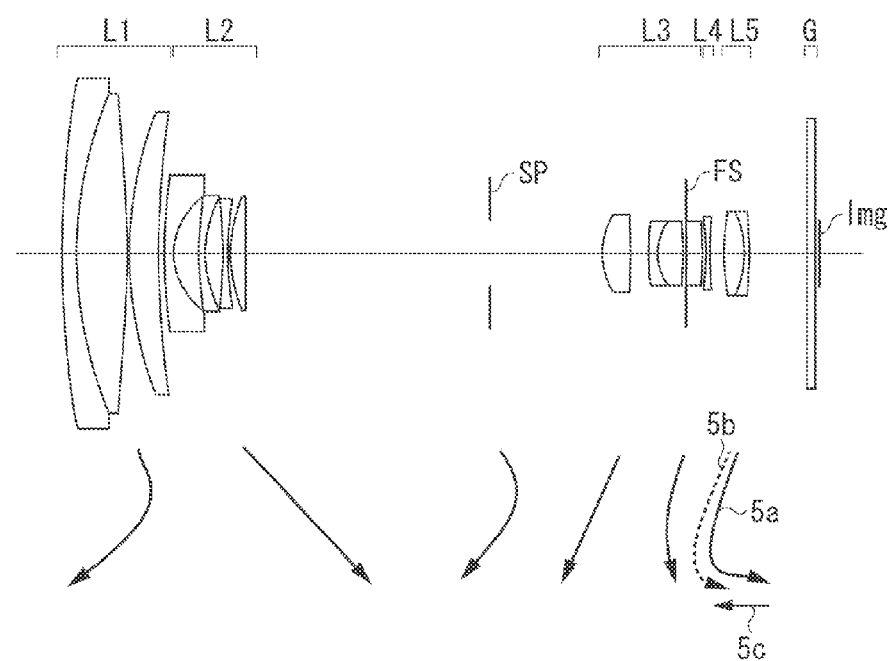
FIG. 7 is a cross-sectional view illustrating a zoom lens according to a fourth exemplary embodiment at the wide-angle end.
Figure 8B:
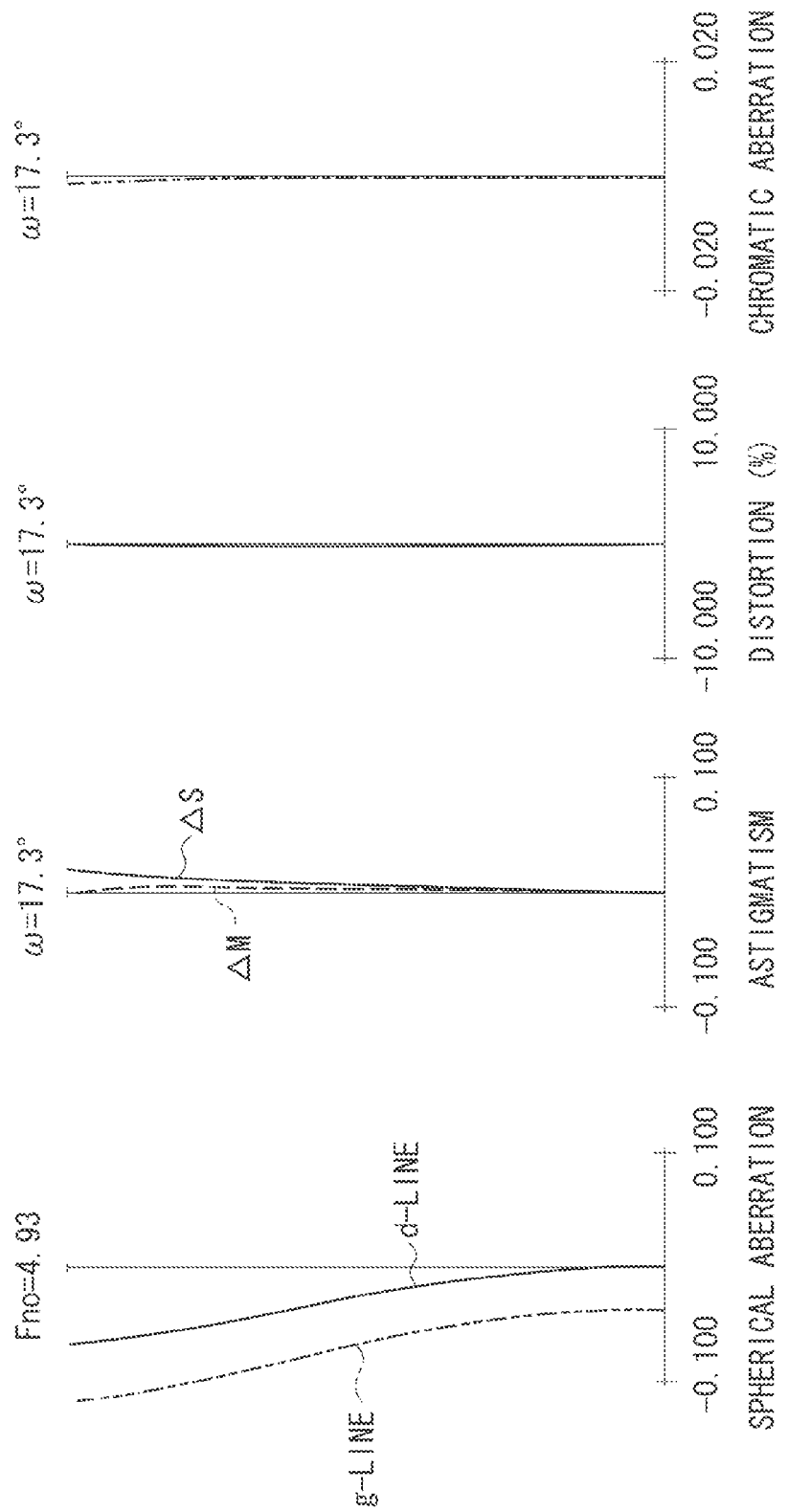
Figure 8C:
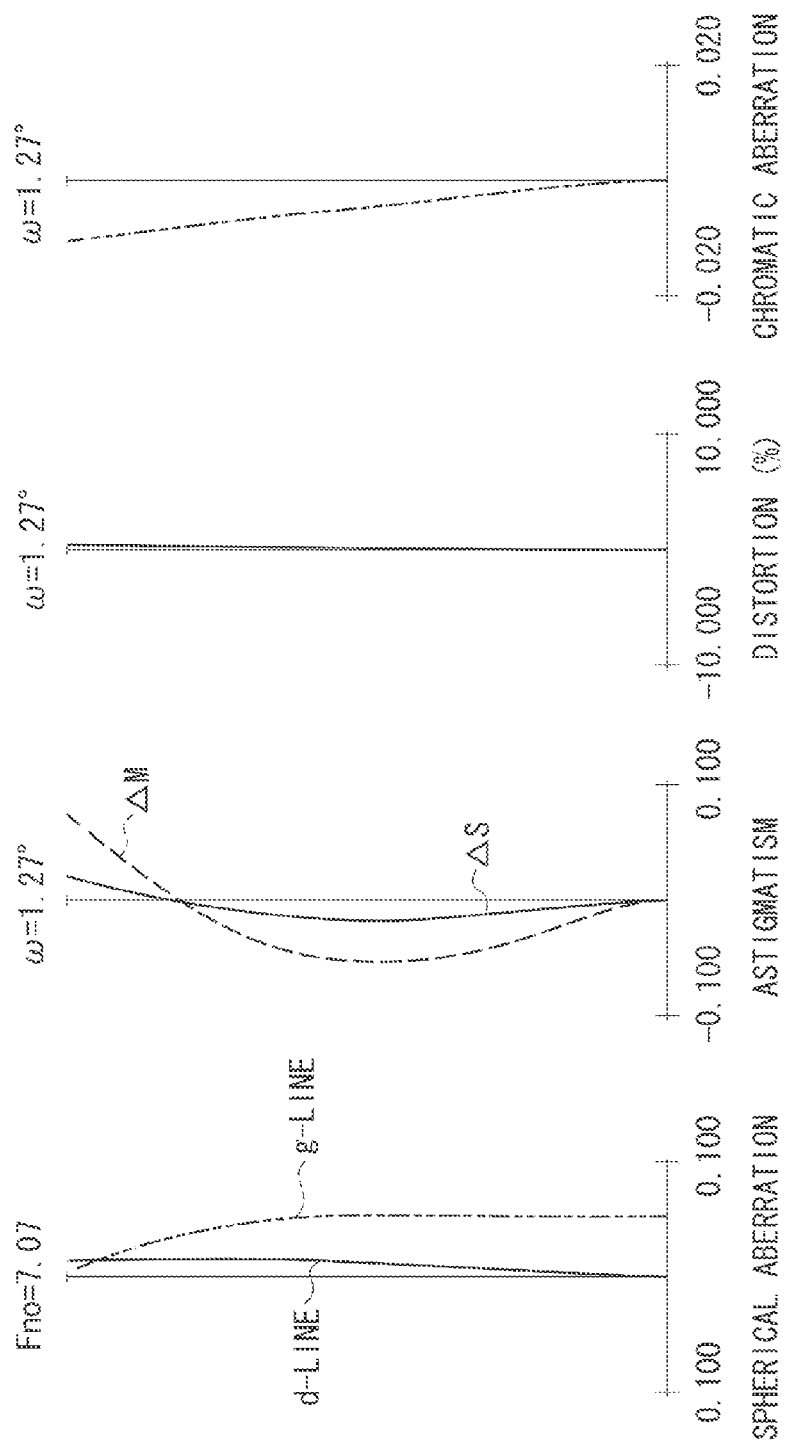

FIG. 5 is a cross-sectional view illustrating a zoom lens according to a third exemplary embodiment at the wide-angle end. FIGS. 6A, 6B, and 6C are aberration charts of the zoom lens according to the third exemplary embodiment at the wide-angle end, in a middle zoom position, and at the telephoto end, respectively. The third exemplary embodiment relates to a zoom lens having a zoom ratio of 41.67 and an aperture ratio of, approximately, 2.87 to 7.07. FIG. 7 is a cross-sectional view illustrating a zoom lens according to a fourth exemplary embodiment at the wide-angle end. FIGS. 8A, 8B, and 8C are aberration charts of the zoom lens according to the fourth exemplary embodiment at the wide-angle end, in a middle zoom position, and at the telephoto end, respectively. The fourth exemplary embodiment relates to a zoom lens having a zoom ratio of 43.64 and an aperture ratio of, approximately, 2.89 to 7.07.

Figure 9:
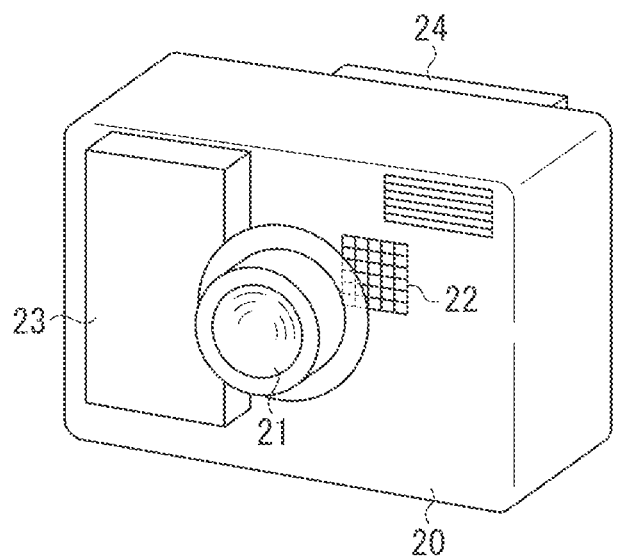
FIG. 9 is a schematic diagram illustrating main components of an image pickup apparatus according to an exemplary embodiment of the present invention.

FIG. 9 is a schematic diagram illustrating main components of a digital still camera (image pickup apparatus) equipped with a zoom lens according to an exemplary embodiment of the present invention. Zoom lenses of each exemplary embodiment refer to an imaging lens system used in an image pickup apparatus such as a video camera, a digital still camera, a silver-halide film camera, and a television camera. The zoom lenses of each exemplary embodiment may be used in a projection optical system for a projection apparatus (projector). In the lens cross-sectional views, the left side refers to an object side (front side), and the right side refers to an image side (rear side). Furthermore, in the lens cross-sectional views, i denotes an order of the lens unit from the object side to the image side, and Li denotes the i-th lens unit.

The zoom lenses according to the first and second exemplary embodiments illustrated in FIGS. 1 and 3 include a first lens unit L1 having positive refractive power, a second lens unit L2 having negative refractive power, an aperture stop SP, a third lens unit L3 having positive refractive power, a fourth lens unit L4 having negative refractive power, and a fifth lens unit L5 having positive refractive power in order from the object side to the image side. In the first and second exemplary embodiments, a positive-lead type 5-unit zoom lens having five lens units is employed.

The zoom lens according to the third exemplary embodiment illustrated in FIG. 5 includes a first lens unit L1 having positive refractive power, a second lens unit L2 having negative refractive power, an aperture stop SP, a third layered product L3 having positive refractive power, and a fourth lens unit L4 having positive refractive power in order from the object side to the image side. In the third exemplary embodiment, a positive-lead type 4-unit zoom lens having four lens units is employed. The zoom lens according to the fourth exemplary embodiment illustrated in FIG. 7 includes a first lens unit L1 having positive refractive power, a second lens unit L2 having negative refractive power, an aperture stop SP, a third lens unit L3 having positive refractive power, a fourth lens unit L4 having positive refractive power, and a fifth lens unit L5 having positive refractive power in order from the object side to the image side. In the fourth exemplary embodiment, a positive-lead type 5-unit zoom lens having five lens units is employed.

In each exemplary embodiment, the aperture stop SP is positioned between the second and third lens units L2 and L3 and moves independently from each lens unit during zooming from the wide-angle end to the telephoto end. In addition, an aperture area of the aperture stop SP may be either variable or invariable. In addition, the aperture stop SP may move integrally with a lens unit during zooming. A flare-cut stop FS is arranged on the image side of the third lens unit L3 to cut off undesired light.

An optical block G corresponds to an optical filter, a faceplate, low-pass filter, an infrared cut-off filter, and the like. Img denotes an image plane. When the zoom lens is employed as an imaging optical system of a video camera or a digital camera, the image plane Img corresponds to a solid-state image sensor (photoelectric conversion element) such as a charge-coupled device (CCD) sensor or a complementary metal-oxide semiconductor (CMOS) sensor. When a zoom lens is employed as an imaging optical system of a silver-halide film camera, the image plane Img corresponds to a film surface. The arrows in the lens cross-sectional views indicate moving loci of each lens unit during zooming from the wide-angle end to the telephoto end.

In a spherical aberration chart, Fno denotes an F-number, the solid line denotes d-line (wavelength=587.6 nm), and the two-dotted chain line denotes g-line (wavelength=435.8 nm). In an astigmatism diagram, the solid line denotes a sagittal image plane with respect to d-line, and the dotted line denotes a meridional image plane with respect to d-line. Distortion is plotted with respect to d-line. In a chromatic aberration of magnification chart, the two-dotted chain line denotes g-line, and ω denotes a half angle of view for imaging. Furthermore, in each exemplary embodiment described below, the wide-angle end and the telephoto end refer to zoom positions when the zoom lens unit is located in respective ends within a movable range on the optical axis under limitation of a mechanism.

According to an embodiment of the present invention, a high zoom ratio is achieved by increasing a zooming contribution of the second lens unit L2. In the zoom lens including the first lens unit L1 having positive refractive power, the second lens unit L2 having negative refractive power, and the third lens unit L3 having positive refractive power in order from the object side to the image side, axial chromatic aberration increases if a zooming contribution of the first lens unit L1 increases. As a result, a movement amount undesirably increases. In addition, if a zooming contribution of the third lens unit L3 increases, a movement amount of the lens unit remarkably increases, compared to a case where a zooming contribution of the second lens unit L2 increases. Therefore, a total lens length undesirably increases.

In this regard, according to an embodiment of the present invention, a high zoom ratio is obtained by increasing a refractive power of the second lens unit L2 to increase a zooming contribution of the second lens unit L2. Furthermore, if a material having a high refractive index is used in a lens having negative refractive power positioned closest to the object side included in the second lens unit L2, it is possible to achieve a thin thickness of the lens and reduce a front lens diameter.

In each exemplary embodiment, the aperture stop SP moves along a locus convex toward the image side unlike other lens units such that a distance between the aperture stop SP and the third lens unit L3 decreases at the telephoto end rather than the wide-angle end. As a result, compared to a case where the aperture stop SP is arranged in the vicinity of the third lens unit L3 and moves integrally with the third lens unit L3, it is possible to move an entrance pupil position toward the object side. For this reason, it is possible to lower an incidence height of an off-axis ray passing through the first or second lens unit L1 or L2. As a result, it is possible to reduce a lens effective diameter. In addition, even when the F-number decreases at the wide-angle end, it is possible to easily suppress an underline flare having an intermediate image height.

In each exemplary embodiment, the third lens unit L3 may move partly or wholly to have a component perpendicular to the optical axis to correct a shake of the captured image generated when the zoom lens is vibrated.

In each exemplary embodiment, focusing is performed by moving a lens unit closest to the image side in the optical axis direction. By using a light-weight lens unit as a focus lens unit, it is possible to rapidly and easily perform focusing. In a case where focusing is performed from an infinitely distant object to a close object at the telephoto end, focusing is performed by moving the lens unit closest to the image side forward as indicated by the arrow 4c or 5c in the lens cross-sectional views. The curves 4a and 5a indicate moving loci for correcting an image plane fluctuation generated during zooming from the wide-angle end to the telephoto end when focusing is performed for an infinitely distant object. The curves 4b and 5b indicate moving loci for correcting an image plane fluctuation generated during zooming from the wide-angle end to the telephoto end when focusing is performed for a close object.

In each exemplary embodiment, the following conditions are satisfied:

$$0.01 < |f2|/ft < 0.057 \quad (1), \text{ and}$$

$$1.90 < Nd2n < 2.50 \quad (2),$$

where f2 denotes a focal length of the second lens unit L2, ft denotes a focal length of the entire zoom lens at the telephoto end, and Nd2n denotes a refractive index of a lens having negative refractive power closest to the object side included in the second lens unit L2.

The condition (1) defines a ratio between the focal length f2 of the second lens unit L2 and the focal length ft of the entire zoom lens at the telephoto end. If the absolute value of the focal length f2 of the second lens unit L2 increases with an upper limit of the condition (1) exceeded, it is difficult to sufficiently correct curvature of field, so that a movement amount of the second lens unit L2 increases to obtain a desired zoom ratio, which undesirably causes an increase of the total lens length. Meanwhile, if the refractive power of the second lens unit L2 increases with a lower limit of the condition (1) exceeded (if the absolute value of the focal length f2 decreases), a fluctuation in chromatic aberration of magnification caused by zooming increases, so that it is difficult to correct a fluctuation in chromatic aberration of magnification. In addition, it is necessary to increase the number of lens elements of the second lens unit L2 to perform correction. Furthermore, it is undesirable that the curvature of each lens increases, the thickness of the second lens unit L2 increases, and the total lens length or the front lens diameter increases.

The condition (2) defines an exemplary numerical range of the refractive index Nd2n of a material of a lens having negative refractive power closest to the object side included in the second lens unit L2. If a value of the refractive index Nd2n increases with an upper limit of the condition (2) exceeded, a positive Petzval sum increases, so that it is difficult to sufficiently correct curvature of field, which is undesirable. If a value of the refractive index Nd2n decreases with a lower limit of the condition (2) exceeded, a curvature of the negative lens closest to the object side included in the second lens unit L2 increases, so that it is difficult to correct a fluctuation in curvature of field and the like caused by zooming. In addition, in order to perform correction, it is necessary to increases a distance between each lens unit or the number of lens elements in each lens unit, which undesirably causes an increase of the total lens length or the front lens diameter.

In each exemplary embodiment, as described above, each element is appropriately set to satisfy the conditions (1) and (2). In addition, in each exemplary embodiment, the numerical ranges of the conditions (1) and (2) may be set as follows:

$$0.025 < |f2|/ft < 0.053 \quad (1a), \text{ and}$$

$$1.93 < Nd2n < 2.31 \quad (2a).$$

In each exemplary embodiment, using the configuration described above, it is possible to obtain a zoom lens having excellent optical performance over the entire zoom range with a wide angle of view and a high zoom ratio.

In each exemplary embodiment, one or more of the following conditions may be satisfied. Here, f1 denotes a focal length of the first lens unit L1, β2w denotes a lateral magnification of the second lens unit L2 at the wide-angle end, β2t denotes a lateral magnification of the second lens unit L2 at the telephoto end, and f2n denotes a focal length of the lens having negative refractive power closest to the object side included in the second lens unit L2. In addition, M1 denotes a movement amount of the first lens unit L1 during zooming from the wide-angle end to the telephoto end, M2 denotes a movement amount of the second lens unit L2, M3 denotes a movement amount of the third lens unit L3, and ν2n denotes an Abbe number of a material of the lens having negative refractive power closest to the object side included in the second lens unit L2. Furthermore, fw denotes a focal length of the entire zoom lens at the wide-angle end. Here, the movement amount refers to a difference between the positions on the optical axis of each lens unit at the wide-angle end and the telephoto end. The sign of the movement amount is set to a positive value when the lens is positioned on the image side at the telephoto end rather than the wide-angle end, and a negative value when the lens is positioned on the object side.

In this case, one or more of the following conditions may be satisfied:

$$0.05 < |f2|/f1 < 0.15 \quad (3);$$

$$15.0 < \beta 2t/\beta 2w < 30.0 \quad (4);$$

$$0.01 < |f2|/ft < 0.07 \quad (5);$$

$$-3.0 < M2/M3 < -0.8 \quad (6);$$

$$20.0 < \nu 2n < 45.0 \quad (7); \text{ and}$$

$$-15.0 < M1/fw < -7.5 \quad (8).$$

The condition (3) defines a ratio between the focal length f1 of the first lens unit L1 and the focal length f2 of the second lens unit L2. If the refractive power of the first lens unit L1 increases with an upper limit of the condition (3) exceeded (if a value of the focal length f1 decreases), axial chromatic aberration on the telephoto end side increases, so that it is necessary to increase the number of lens elements in the first lens unit L1 to perform correction. As a result, this undesirably causes an increase of the total lens length or the front lens diameter. If the focal length f1 of the first lens unit L1 increases with a lower limit of the condition (3) exceeded, this undesirably causes an increase of the total lens length.

The condition (4) defines a ratio between a lateral magnification β2t of the second lens unit L2 at the telephoto end and a lateral magnification β2w of the second lens unit L2 at the wide-angle end. If a zoom ratio of the second lens unit L2 increases with an upper limit of the condition (4) exceeded, it is difficult to correct a fluctuation in curvature of field or chromatic aberration of magnification, which is undesirable. If a zoom ratio of the second lens unit L2 decreases with a lower limit of the condition (4) exceeded, it is necessary to increase a zoom ratio of a lens unit or lens units positioned on the image side of the second lens unit L2. For this reason, it is necessary to increase a movement amount of each lens unit. Therefore, it is difficult to correct coma and the like, and this undesirably causes an increase of the total lens length.

The condition (5) defines a ratio between a focal length f2n of a lens having negative refractive power closest to the object side included in the second lens unit L2 and a focal length ft of the entire zoom lens at the telephoto end. If an absolute value of the focal length f2n of a negative lens closest to the object side included in the second lens unit L2 increases with an upper limit of the condition (5) exceeded, it is difficult to obtain the entire focal length necessary in the second lens unit L2, which is undesirable. If the refractive power of a negative lens closest to the object side included in the second lens unit L2 increases with a lower limit of the condition (5) exceeded (as an absolute value of the focal length f2n decreases), a curvature increases so that it is difficult to correct coma and the like, which is undesirable.

The condition (6) defines a ratio between the movement amount M2 of the second lens unit L2 and the movement amount M3 of the third lens unit L3 during zooming from the wide-angle end to the telephoto end. If the movement amount M3 of the third lens unit L3 increases with an upper limit of the condition (6) exceeded, it is difficult to correct coma and the like, and this causes an increase of the total lens length, which is undesirable. If the movement amount M2 of the second lens unit L2 increases with a lower limit of the condition (6) exceeded, it is difficult to correct a fluctuation in curvature of field or chromatic aberration of magnification, which is undesirable.

The condition (7) defines an exemplary numerical range of the Abbe number ν2n of a material of the lens having negative refractive power closest to the object side included in the second lens unit L2. If a value of the Abbe number ν2n increases with an upper limit of the condition (7) exceeded, axial chromatic aberration at the telephoto side is excessively corrected, which is undesirable. If a value of the Abbe number ν2n decreases with a lower limit of the condition (7) exceeded, the negative lens closest to the object side included in the second lens unit L2 becomes highly dispersive. In addition, a fluctuation in chromatic aberration of magnification caused by zooming increases, and it is difficult to correct a fluctuation in chromatic aberration of magnification, which is undesirable.

The condition (8) defines an exemplary ratio between the movement amount M1 of the first lens unit L1 and the focal length fw of the entire zoom lens at the wide-angle end during zooming from the wide-angle end to the telephoto end. If the movement amount M1 toward the object side decreases with a lower limit of the condition (8) exceeded, a variation in distance between the first and second lens units L1 and L2 is reduced. Therefore, a zooming contribution of the second lens unit L2 decreases, and it is difficult to obtain a high zoom ratio, which is undesirable. If the movement amount M1 toward the object side increases with a lower limit of the condition (8) exceeded, the total lens length increases, which is undesirable.

The numerical ranges of the conditions (3) to (8) may be set as follows:

$$0.08 < |f2|/f1 < 0.12 \quad (3a);$$

$$15.2 < \beta 2t/2w < 20.0 \quad (4a);$$

$$0.032 < |f2n|/ft < 0.062 \quad (5a);$$

$$-2.3 < M2/M3 < -1.2 \quad (6a);$$

$$25.0 < \nu 2n < 36.5 \quad (7a); \text{ and}$$

$$-10.0 < M1/fw < -8.5 \quad (8a).$$

In each exemplary embodiment, by configuring each element as described above, it is possible to obtain a zoom lens having excellent optical performance in a reduced size of the entire zoom lens with a wide angle of view and a high zoom ratio and capable of sufficiently correcting various aberrations such as axial chromatic aberration, chromatic aberration of magnification, spherical aberration, and curvature of field over the entire zoom range. The aforementioned conditions may be arbitrarily combined in a plurality of forms to further improve the effect of the present invention.

An image pickup apparatus according to an exemplary embodiment of the present invention may further include a circuit for correcting any one or both of distortion and chromatic aberration of magnification through image processing in addition to any one of the zoom lenses described above. In this manner, if a configuration capable of overcoming distortion of the zoom lens is provided, it is possible to reduce the number of lens elements in the entire zoom lens and easily reduce the total lens length. In addition, by correcting chromatic aberration of magnification through image processing, it is possible to alleviate color blurring in an image and easily improve a resolution.

Next, a lens configuration in each exemplary embodiment will be described. Each exemplary embodiment has a common configuration in the first to third lens units L1, L2, and L3. The first lens unit L1 having positive refractive power includes a cemented lens obtained by combining negative and positive lenses and a positive lens in order from the object side to the image side and moves toward the object side along a locus convex toward the image side during zooming. In this configuration, it is possible to effectively correct axial chromatic aberration at the telephoto end and implement a high zoom ratio with a small number of lens elements.

The second lens unit L2 having negative refractive power includes a negative lens having a concave surface facing the image side, a negative lens having a concave surface facing the image side, a negative lens, and a positive lens having a meniscus shape with a convex surface facing the object side in order from the object side to the image side and moves toward the image side during zooming. In this configuration, it is possible to implement a high zoom ratio and effectively suppress an aberration fluctuation caused by zooming.

The third lens unit L3 having positive refractive power includes a positive lens having a convex surface facing the object side, and a cemented lens obtained by combining a negative lens having a concave surface facing the image side and a positive lens having a convex surface facing the object side in order from the object side to the image side and moves toward the object side during zooming. In the positive lens closest to the object side included in the third lens unit L3, an object-side surface and an image-side surface have an aspheric shape. In this configuration, it is possible to appropriately correct spherical aberration or comma with a small number of lens elements.

The zoom lenses according to the first and second exemplary embodiments include a first lens unit L1 having positive refractive power, a second lens unit L2 having negative refractive power, a third lens unit L3 having positive refractive power, a fourth lens unit L4 having negative refractive power, and a fifth lens unit L5 having positive refractive power in order from the object side to the image side. The fourth lens unit L4 having negative refractive power includes only a single lens having negative refractive power. The fifth lens unit L5 having positive refractive power includes a cemented lens obtained by combining positive and negative lenses in order from the object side to the image side. In the zoom lenses according to the first and second exemplary embodiments, the fourth lens unit L4 having negative refractive power is provided to increase focus sensitivity of the fifth lens unit L5 used as a focus lens unit. As a result, it is possible to reduce a movement amount of the fifth lens unit L5 during focusing.

The zoom lens according to the third exemplary embodiment includes a first lens unit L1 having positive refractive power, a second lens unit L2 having negative refractive power, a third lens unit L3 having positive refractive power, and a fourth lens unit L4 having positive refractive power in order from the object side to the image side. The fourth lens unit L4 having positive refractive power includes a negative lens and a cemented lens obtained by combining positive and negative lenses in order from the object side to the image side. In the zoom lens according to the third exemplary embodiment, the total lens length is shortened by reducing the number of lens units.

The zoom lens according to the fourth exemplary embodiment includes a first lens unit L1 having positive refractive power, a second lens unit L2 having negative refractive power, a third lens unit L3 having positive refractive power, a fourth lens unit L4 having positive refractive power, and a fifth lens unit L5 having positive refractive power in order from the object side to the image side. The fourth lens unit L4 having positive refractive power includes only a single lens having positive refractive power. The fifth lens unit L5 having positive refractive power includes a negative lens and a cemented lens obtained by combining positive and negative lenses in order from the object side to the image side. The zoom lens according to the fourth exemplary embodiment includes a fourth lens unit L4 having positive refractive power, and a distance between the third and fourth lens units L3 and L4 increases during zooming. By appropriately setting the distance between the third and fourth lens units L3 and L4, it is possible to correct coma, which is introvert, at the telephoto end and appropriately correct chromatic aberration of magnification.

While exemplary embodiments of the present invention have been described hereinbefore, various modifications and variations may be possible within the scope and spirit of the invention without limiting to such exemplary embodiments.

Next, description will be made with reference to FIG. 9 for an exemplary digital still camera in which a zoom lens according to an exemplary embodiment of the present invention is employed as a photographic optical system. Referring to FIG. 9, the digital still camera includes: a camera body 20; a photographic optical system 21 including the zoom lens described in any one of the first to fourth exemplary embodiments; a solid-state image sensor (photoelectric conversion element) 22 such as a charge-coupled device sensor or a complementary metal-oxide semiconductor sensor mounted on the camera body 20 to receive light of an object image formed by the photographic optical system 21, a memory 23 for storing information corresponding to the object image photoelectrically converted by the solid-state image sensor 22, and a viewfinder 24 including a liquid crystal display panel for observing an object image formed on the solid-state image sensor 22. In this manner, by applying the zoom lens according to the present invention to an image pickup apparatus such as a digital still camera, it is possible to implement an image pickup apparatus having excellent optical performance with a small size.

Next, Numerical Examples 1 to 4 corresponding to the first to fourth exemplary embodiments, respectively, of the present invention will be described. In each of the numerical examples, i denotes the order of an optical surface counted from the object side, ri denotes a radius of curvature of the i-th optical surface (i-th surface), and di denotes a distance between the i-th surface and the (i+1)th surface. In addition, ndi and vdi denote a refractive index and an Abbe number, respectively, of a material of the i-th optical member with respect to d-line.

An aspheric surface shape can be expressed as:

$$x=(h^2/R)/[1+\{1-(1+k)(h/R)^2\}^{1/2}]+A4h^4+A6h^6+A8h^8+A10h^{10},$$

where k denotes eccentricity, A4, A6, A8, and A10 denote aspheric coefficients, x denotes a displacement in the optical axis direction at a position having a height h from the optical axis with respect to a surface vertex, and R denotes a paraxial radius of curvature. In the numerical examples, two surfaces closest to the image side are a surface of an optical block such as a filter or a faceplate. In addition, SP denotes an aperture stop (or iris stop), FS denotes a flare-cut stop, and G denotes a glass block such as a quartz low-pass filter or an infrared cut-off filter. Img denotes an image plane where a photosensitive surface of a solid-state image sensor (photoelectric conversion element) such as a CCD sensor or a CMOS sensor is positioned. The values of the aforementioned conditions in each of the numerical examples are described in Table 1.

NUMERICAL EXAMPLE 1

| Unit: mm | | | | |
|---|---|---|---|---|
| Surface Data | | | | |
| Surface Number | r | d | nd | vd |
| 1 | 121.795 | 1.80 | 1.83400 | 37.2 |
| 2 | 49.164 | 6.00 | 1.49700 | 81.5 |
| 3 | −173.017 | 0.20 | | |
| 4 | 42.006 | 3.50 | 1.59282 | 68.6 |
| 5 | 125.211 | (Variable) | | |
| 6 | 88.754 | 1.00 | 2.00100 | 29.1 |
| 7 | 8.499 | 3.10 | | |

-continued

Unit: mm

| | | | | |
|---|---|---|---|---|
| 8 | 34.955 | 0.70 | 1.51633 | 64.1 |
| 9 | 15.310 | 2.00 | | |
| 10 | −46.368 | 0.70 | 1.80400 | 46.6 |
| 11 | 31.226 | 0.20 | | |
| 12 | 16.990 | 1.80 | 1.95906 | 17.5 |
| 13 | 207.278 | (Variable) | | |
| 14(Aperture Stop) | ∞ | (Variable) | | |
| 15* | 9.436 | 3.30 | 1.55332 | 71.7 |
| 16* | −138.882 | 2.00 | | |
| 17 | 23.833 | 1.30 | 1.83481 | 42.7 |
| 18 | 6.103 | 2.90 | 1.49700 | 81.5 |
| 19 | −56.502 | 0.30 | | |
| 20 | ∞ | (Variable) | | |
| 21 | −46.085 | 0.70 | 1.48749 | 70.2 |
| 22 | 28.739 | (Variable) | | |
| 23 | 27.523 | 2.30 | 1.83481 | 42.7 |
| 24 | −12.487 | 0.60 | 1.84666 | 23.8 |
| 25 | −63.058 | (Variable) | | |
| 26 | ∞ | 1.00 | 1.51633 | 64.1 |
| 27 | ∞ | 1.00 | | |
| Image Plane | ∞ | | | |

Aspheric Surface Data

Fifteenth Surface

K = −1.90668e−001 A4 = −5.52586e−006 A6 = 3.05369e−007
A8 = −3.33145e−008 A10 = 8.54000e−010
Sixteenth Surface K = 5.63494e+002 A4 = 1.29451e−004 A6 = 3.84312e−007

Various Data
Zoom Ratio 51.39

| | Wide-Angle | Middle | Telephoto |
|---|---|---|---|
| Focal Length | 4.11 | 12.54 | 211.23 |
| F-number | 2.87 | 4.93 | 7.07 |
| Angle of View | 39.03 | 17.18 | 1.05 |
| Image Height | 3.33 | 3.88 | 3.88 |
| Total Lens Length | 94.56 | 96.02 | 134.23 |
| BF (Back Focus) | 10.69 | 16.66 | 7.80 |
| d5 | 0.80 | 15.68 | 63.90 |
| d13 | 29.19 | 16.41 | 0.53 |
| d14 | 13.49 | 0.30 | 0.30 |
| d20 | 2.20 | 6.64 | 13.22 |
| d22 | 3.78 | 5.93 | 14.08 |
| d25 | 9.03 | 15.01 | 6.14 |

Zoom Lens Unit Data

| Lens Unit | Starting Surface | Focal Length |
|---|---|---|
| 1 | 1 | 80.80 |
| 2 | 6 | −8.71 |
| 3 | 15 | 18.01 |
| 4 | 21 | −36.20 |
| 5 | 23 | 23.69 |

NUMERICAL EXAMPLE 2

Unit: mm

Surface Data

| Surface Number | r | d | nd | vd |
|---|---|---|---|---|
| 1 | 107.655 | 1.80 | 1.83400 | 37.2 |
| 2 | 47.507 | 6.00 | 1.49700 | 81.5 |
| 3 | −209.763 | 0.20 | | |
| 4 | 41.462 | 3.50 | 1.59282 | 68.6 |
| 5 | 117.532 | (Variable) | | |

-continued

Unit: mm

| | | | | |
|---|---|---|---|---|
| 6 | 38.420 | 1.00 | 2.30000 | 25.5 |
| 7 | 8.591 | 3.10 | | |
| 8 | 41.509 | 0.70 | 1.59282 | 68.6 |
| 9 | 15.078 | 2.00 | | |
| 10 | −60.313 | 0.70 | 1.69680 | 55.5 |
| 11 | 30.907 | 0.20 | | |
| 12 | 16.906 | 1.80 | 1.95906 | 17.5 |
| 13 | 194.568 | (Variable) | | |
| 14(Aperture Stop) | ∞ | (Variable) | | |
| 15* | 9.166 | 3.30 | 1.55332 | 71.7 |
| 16* | −146.352 | 2.00 | | |
| 17 | 24.076 | 1.30 | 1.83481 | 42.7 |
| 18 | 5.980 | 2.90 | 1.49700 | 81.5 |
| 19 | −61.563 | 0.30 | | |
| 20 | ∞ | (Variable) | | |
| 21 | −33.085 | 0.70 | 1.48749 | 70.2 |
| 22 | 35.522 | (Variable) | | |
| 23 | 29.613 | 2.30 | 1.83481 | 42.7 |
| 24 | −10.226 | 0.60 | 1.84666 | 23.8 |
| 25 | −53.768 | (Variable) | | |
| 26 | ∞ | 1.00 | 1.51633 | 64.1 |
| 27 | ∞ | 1.00 | | |
| Image Plane | ∞ | | | |

Aspheric Surface Data

Fifteenth Surface

K = −2.78194e−001 A4 = −5.71435e−006 A6 = 1.46733e−006
A8 = −1.90994e−008 A10 = 7.30173e−010
Sixteenth Surface K = 5.79258e+002 A4 = 1.12832e−004 A6 = 2.21247e−006

Various Data
Zoom Ratio 64.34

| | Wide-Angle | Middle | Telephoto |
|---|---|---|---|
| Focal Length | 4.08 | 12.97 | 262.59 |
| F-number | 2.87 | 4.93 | 7.07 |
| Angle of View | 39.23 | 16.63 | 0.85 |
| Image Height | 3.33 | 3.88 | 3.88 |
| Total Lens Length | 94.84 | 94.76 | 131.59 |
| BF | 10.70 | 14.27 | 0.92 |
| d5 | 0.77 | 14.52 | 64.52 |
| d13 | 28.64 | 16.18 | 0.89 |
| d14 | 14.17 | 0.30 | 0.52 |
| d20 | 2.21 | 11.13 | 12.92 |
| d22 | 3.94 | 3.96 | 17.41 |
| d25 | 9.84 | 13.41 | 0.09 |

Zoom Lens Unit Data

| Lens Unit | Starting Surface | Focal Length |
|---|---|---|
| 1 | 1 | 80.68 |
| 2 | 6 | −8.55 |
| 3 | 15 | 17.95 |
| 4 | 21 | −35.02 |
| 5 | 23 | 23.74 |

NUMERICAL EXAMPLE 3

Unit: mm

Surface Data

| Surface Number | r | d | nd | vd |
|---|---|---|---|---|
| 1 | 123.517 | 1.80 | 1.83400 | 37.2 |
| 2 | 49.043 | 6.00 | 1.49700 | 81.5 |
| 3 | −173.716 | 0.20 | | |

-continued

Unit: mm

| | | | | |
|---|---|---|---|---|
| 4 | 41.868 | 3.50 | 1.59282 | 68.6 |
| 5 | 126.408 | (Variable) | | |
| 6 | 103.274 | 1.00 | 1.94000 | 36.0 |
| 7 | 8.518 | 3.10 | | |
| 8 | 32.657 | 0.70 | 1.83481 | 42.7 |
| 9 | 15.173 | 2.00 | | |
| 10 | −53.198 | 0.70 | 1.77250 | 49.6 |
| 11 | 32.604 | 0.20 | | |
| 12 | 16.861 | 1.80 | 1.92286 | 18.9 |
| 13 | 219.777 | (Variable) | | |
| (Aperture Stop) | ∞ | (Variable) | | |
| 15* | 9.446 | 3.30 | 1.55332 | 71.7 |
| 16* | −148.505 | 2.00 | | |
| 17 | 23.123 | 1.30 | 1.83481 | 42.7 |
| 18 | 6.102 | 2.90 | 1.49700 | 81.5 |
| 19 | −61.864 | 0.30 | | |
| 20 | ∞ | (Variable) | | |
| 21 | −54.404 | 0.70 | 1.48749 | 70.2 |
| 22 | 26.024 | 2.00 | | |
| 23 | 28.146 | 2.30 | 1.83481 | 42.7 |
| 24 | −13.313 | 0.60 | 1.84666 | 23.8 |
| 25 | −59.884 | (Variable) | | |
| 26 | ∞ | 1.00 | 1.51633 | 64.1 |
| 27 | ∞ | 0.20 | | |
| Image Plane | ∞ | | | |

Aspheric Surface Data

Fifteenth Surface

K = −1.94279e−001 A4 = −2.44163e−006 A6 = 4.95673e−007
A8 = −2.21380e−008 A10 = 5.49114e−010
Sixteenth Surface K = 6.00981e+002 A4 = 1.28301e−004 A6 = 7.08493e−007

Various Data
Zoom Ratio 41.67

| | Wide-Angle | Middle | Telephoto |
|---|---|---|---|
| Focal Length | 3.91 | 11.88 | 162.78 |
| F-number | 2.87 | 4.93 | 7.07 |
| Angle of View | 40.47 | 18.06 | 1.36 |
| Image Height | 3.33 | 3.88 | 3.88 |
| Total Lens Length | 93.42 | 92.78 | 127.69 |
| BF | 11.01 | 16.95 | 13.49 |
| d5 | 0.80 | 15.61 | 63.97 |
| d13 | 28.91 | 16.47 | 0.61 |
| d14 | 13.91 | 0.50 | 0.31 |
| d20 | 2.40 | 6.85 | 12.92 |
| d25 | 9.35 | 15.29 | 11.83 |

Zoom Lens Unit Data

| Lens Unit | Starting Surface | Focal Length |
|---|---|---|
| 1 | 1 | 80.99 |
| 2 | 6 | −8.52 |
| 3 | 15 | 17.99 |
| 4 | 21 | 56.73 |

NUMERICAL EXAMPLE 4

Unit: mm

Surface Data

| Surface Number | r | d | nd | vd |
|---|---|---|---|---|
| 1 | 120.955 | 1.80 | 1.83400 | 37.2 |
| 2 | 50.855 | 6.00 | 1.49700 | 81.5 |
| 3 | −166.914 | 0.20 | | |

-continued

Unit: mm

| | | | | |
|---|---|---|---|---|
| 4 | 42.729 | 3.50 | 1.59282 | 68.6 |
| 5 | 111.562 | (Variable) | | |
| 6 | 89.467 | 1.00 | 2.00069 | 25.5 |
| 7 | 8.554 | 3.10 | | |
| 8 | 41.060 | 0.70 | 1.59282 | 68.6 |
| 9 | 13.775 | 2.00 | | |
| 10 | −62.882 | 0.70 | 1.80400 | 46.6 |
| 11 | 31.341 | 0.20 | | |
| 12 | 16.557 | 1.80 | 1.95906 | 17.5 |
| 13 | 259.772 | (Variable) | | |
| 14(Aperture Stop) | ∞ | (Variable) | | |
| 15* | 9.507 | 3.30 | 1.55332 | 71.7 |
| 16* | −135.668 | 2.00 | | |
| 17 | 23.658 | 1.30 | 1.83481 | 42.7 |
| 18 | 6.156 | 2.90 | 1.49700 | 81.5 |
| 19 | −61.576 | 0.30 | | |
| 20 | ∞ | (Variable) | | |
| 21 | −57.600 | 2.00 | 1.48749 | 70.2 |
| 22 | −41.437 | (Variable) | | |
| 23 | −40.175 | 0.70 | 1.48749 | 70.2 |
| 24 | 34.105 | 2.00 | | |
| 25 | 27.212 | 2.30 | 1.83481 | 42.7 |
| 26 | −11.336 | 0.60 | 1.84666 | 23.8 |
| 27 | −70.283 | (Variable) | | |
| 28 | ∞ | 1.00 | 1.51633 | 64.1 |
| 29 | ∞ | 1.00 | | |
| Image Plane | ∞ | | | |

Aspheric Surface Data

Fifteenth Surface

K = −1.70654e−001 A4 = −1.59984e−006 A6 = 4.66232e−007
A8 = −2.65617e−008 A10 = 5.99053e−010
Sixteenth Surface K = 6.09888e+002 A4 = 1.36395e−004 A6 = 1.04661e−006

Various Data
Zoom Ratio 43.64

| | Wide-Angle | Middle | Telephoto |
|---|---|---|---|
| Focal Length | 4.00 | 12.42 | 174.61 |
| F-number | 2.89 | 4.93 | 7.07 |
| Angle of View | 39.79 | 17.32 | 1.27 |
| Image Height | 3.33 | 3.88 | 3.88 |
| Total Lens Length | 94.29 | 95.04 | 131.89 |
| BF | 8.44 | 12.03 | 6.50 |
| d5 | 0.77 | 16.15 | 66.06 |
| d13 | 29.19 | 16.40 | 0.50 |
| d14 | 13.49 | 0.30 | 0.30 |
| d20 | 2.00 | 6.00 | 10.00 |
| d22 | 2.00 | 5.75 | 10.12 |
| d27 | 6.78 | 10.37 | 4.84 |

Zoom Lens Unit Data

| Lens Unit | Starting Surface | Focal Length |
|---|---|---|
| 1 | 1 | 83.67 |
| 2 | 6 | −8.71 |
| 3 | 15 | 18.10 |
| 4 | 21 | 291.10 |
| 5 | 23 | 57.09 |

TABLE 1

| Condition | Numerical Example 1 | Numerical Example 2 | Numerical Example 3 | Numerical Example 4 |
|---|---|---|---|---|
| \|f2\|/ft | 0.041 | 0.033 | 0.052 | 0.050 |
| Nd2n | 2.00 | 2.30 | 1.94 | 2.00 |
| \|f2\|/f1 | 0.108 | 0.106 | 0.105 | 0.104 |
| β2t/β2w | 16.7 | 19.8 | 15.9 | 15.3 |

TABLE 1-continued

| Condition | Numerical Example 1 | Numerical Example 2 | Numerical Example 3 | Numerical Example 4 |
|---|---|---|---|---|
| $\|f2n\|/f$ | 0.045 | 0.033 | 0.061 | 0.054 |
| M2/M3 | −1.27 | −1.87 | −2.22 | −1.95 |
| ν2n | 29.1 | 25.5 | 36.0 | 25.5 |
| M1/fw | −9.65 | −9.00 | −8.77 | −9.40 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-123562 filed May 30, 2012, which is hereby incorporated by reference herein in its entirety.

What is claimed is:

1. A zoom lens comprising, in order from an object side to an image side, a first lens unit having positive refractive power, a second lens unit having negative refractive power, and a third lens unit having positive refractive power,
wherein at least the first lens unit, the second lens unit, and the third lens unit move during zooming from a wide-angle end to a telephoto end, and
wherein the following conditions are satisfied:

$$0.01 < |f2|/ft < 0.057, \text{ and}$$

$$1.90 < Nd2n < 2.50,$$

where f2 denotes a focal length of the second lens unit, ft denotes a focal length of the entire zoom lens at the telephoto end, and Nd2n denotes a refractive index of a lens having negative refractive power closest to the object side included in the second lens unit.

2. The zoom lens according to claim 1, wherein a condition $0.05 < |f2|/f1 < 0.15$ is satisfied, where f1 denotes a focal length of the first lens unit.

3. The zoom lens according to claim 1, wherein a condition $15.0 < \beta 2t/\beta 2w < 30.0$ is satisfied, where β2w denotes a lateral magnification of the second lens unit at the wide-angle end, and β2t denotes a lateral magnification of the second lens unit at the telephoto end.

4. The zoom lens according to claim 1, wherein a condition $0.01 < |f2n|/ft < 0.07$ is satisfied, where f2n denotes a focal length of the lens having negative refractive power closest to the object side included in the second lens unit.

5. The zoom lens according to claim 1, wherein a condition $-3.0 < M2/M3 < -0.8$ is satisfied, where M2 denotes a movement amount in an optical axis direction of the second lens unit during zooming from the wide-angle end to the telephoto end, and M3 denotes a movement amount in the optical axis direction of the third lens unit during zooming from the wide-angle end to the telephoto end.

6. The zoom lens according to claim 1, wherein a condition $20.0 < \nu 2n < 45.0$ is satisfied, where ν2n denotes an Abbe number of a material of the lens having negative refractive power closest to the object side included in the second lens unit.

7. The zoom lens according to claim 1, wherein a condition $-15.0 < M1/fw < -7.5$ is satisfied, where M1 denotes a movement amount in an optical axis direction of the first lens unit during zooming from the wide-angle end to the telephoto end, and fw denotes a focal length of the entire zoom lens at the wide-angle end.

8. The zoom lens according to claim 1, further comprising an aperture stop that moves independently from each lens unit during zooming from the wide-angle end to the telephoto end, wherein the aperture stop is located between the second lens unit and the third lens unit and moves along a locus convex toward the image side.

9. The zoom lens according to claim 1, further comprising, on the image side of the third lens unit, a fourth lens unit having negative refractive power and a fifth lens unit having positive refractive power.

10. The zoom lens according to claim 1, further comprising, on the image side of the third lens unit, a fourth lens unit having positive refractive power and a fifth lens unit having positive refractive power.

11. The zoom lens according to claim 9, wherein the fifth lens unit moves toward the object side during focusing from an infinitely distant object to a close object.

12. The zoom lens according to claim 10, wherein the fifth lens unit moves toward the object side during focusing from an infinitely distant object to a close object.

13. The zoom lens according to claim 1, further comprising, on the image side of the third lens unit, a fourth lens unit having positive refractive power.

14. The zoom lens according to claim 13, wherein the fourth lens unit moves toward the object side during focusing from an infinitely distant object to a close object.

15. An image pickup apparatus comprising:
a zoom lens; and
an image sensor configured to receive an image formed by the zoom lens,
wherein the zoom lens comprises, in order from an object side to an image side:
a first lens unit having a positive refractive power;
a second lens unit having a negative refractive power; and
a third lens unit having a positive refractive power,
wherein at least the first lens unit, the second lens unit, and the third lens unit move during zooming from a wide-angle end to a telephoto end, and
wherein the following conditions are satisfied:

$$0.01 < |f2|/ft < 0.057, \text{ and}$$

$$1.90 < Nd2n < 2.50,$$

where f2 denotes a focal length of the second lens unit, ft denotes a focal length of the entire zoom lens at the telephoto end, and Nd2n denotes a refractive index of a lens having negative refractive power closest to the object side included in the second lens unit.

* * * * *